Nov. 7, 1967   P. A. FEDDE   3,350,928
COMPRESSOR TESTING APPARATUS AND METHOD
Filed May 6, 1965
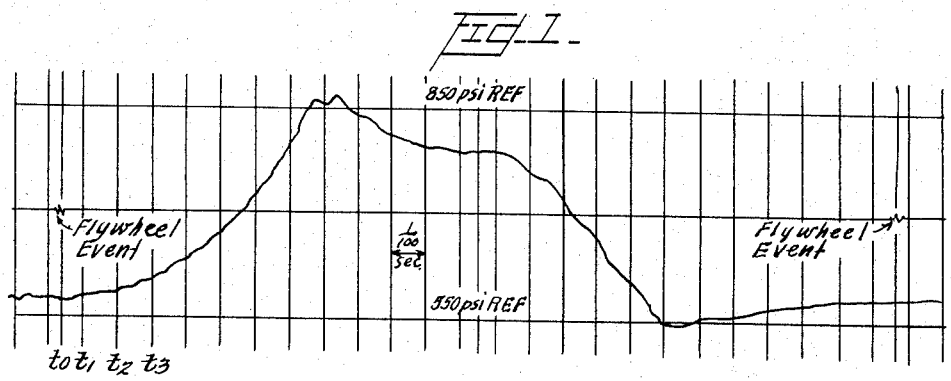
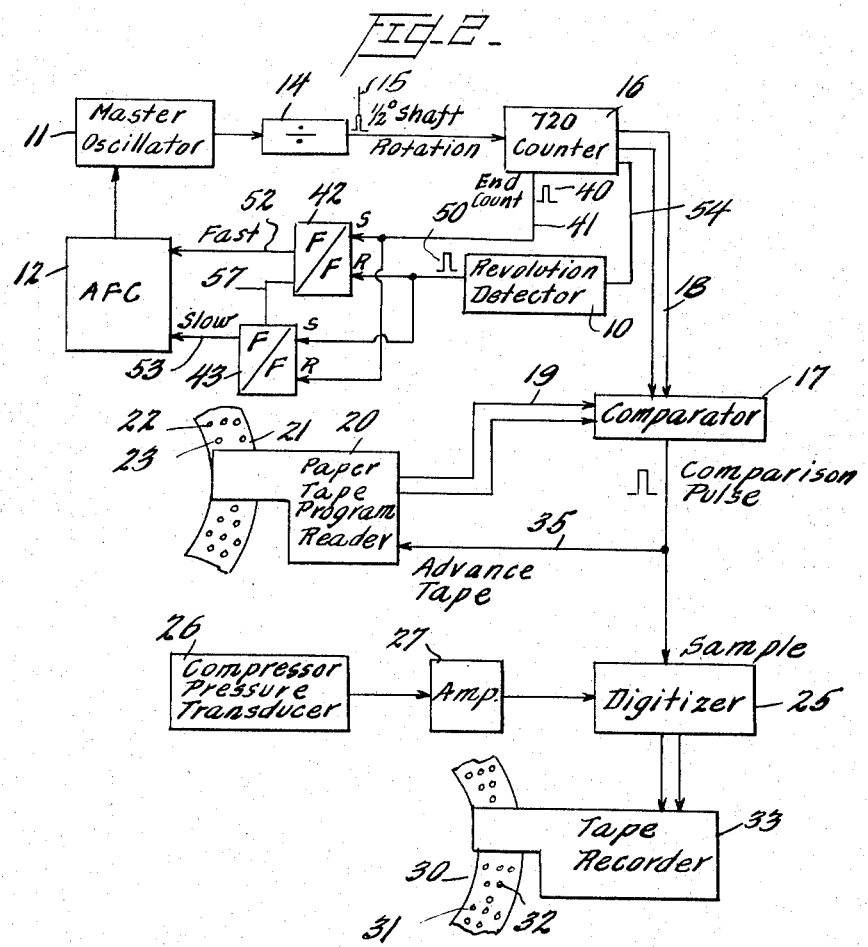
INVENTOR
Paul A. Fedde,
BY Watson, Cole, Grindle & Watson
ATTORNEYS

United States Patent Office 3,350,928
Patented Nov. 7, 1967

3,350,928
COMPRESSOR TESTING APPARATUS AND METHOD
Paul A. Fedde, Owensboro, Ky., assignor to Texas Gas Transmission Corporation, Owensboro, Ky., a corporation of Kentucky
Filed May 6, 1965, Ser. No. 453,581
4 Claims. (Cl. 73—116)

ABSTRACT OF THE DISCLOSURE

This disclosure relates to automated test equipment for analyzing the cyclic performance of a compressor as sampled at various specified instantaneous times from a pressure transducer in the compressor cylinder, for example. The sampling times are programmed such as by a coded paper tape to specify the time increments at which samples are taken which may reflect any arbitrary function of time which can be used, for example, to analyze performance over piston travel, critical pressure ranges, etc. as desired to permit various sorts of analysis of the compressor performance. The timing is under control of an oscillator-clock that is counted down until a comparison is made with the current programmed clock-count at which a sample is desired. In developing an entire performance curve the compressor is cyclically operated and one sample reading may be taken each cycle or fixed multiple of cycles at a progressive sampling period progressing through the compressor stroke to thereby in essence provide an averaged set of instantaneous samples over a large number of cycles to produce a composite performance chart. Output sample readings may be digitized and recorded on paper tape so that results may be analyzed by computations in a conventional computer if desired or charted automatically in a digitally responsive recorder.

---

This invention relates to testing devices for compressors and more particularly it relates to improvements in testing devices of the type described in the American Society of Mechanical Engineer's Publication No. 63–OGP–14, which is incorporated by reference herein as a portion of this disclosure.

In the natural gas industry compressors used to pump the gas need to be evaluated in performance. Some of the calculations made on test data to determine performance are made to determine horsepower, mean effective pressure, volumetric efficiency, suction and discharge losses and slopes of compression and expansion lines. The prior art equipment above referenced has provided for such measurements by electrically reproducing compressor performance or multiple trace oscillograph records correlating various factors in the operation cycle. Such records can be processed in a computer for analysis by taking digital readings from the oscillograph traces at specified increments and processing such readings automatically in a computer to calculate the test results above mentioned.

In connection with calculations made from the raw data taken as a function of pressure within the compressor cylinder, the various calculations may be processed as a function of different variables of time during a compressor cycle. For example, the sampling of readings during the compressor cycle is different if taken on a time axis say every .01 of a second than they would be if they were taken on a fixed increment of displacement basis because of the cyclic movement of the piston within the compressor chamber relative to the time axis. Accordingly, any compressor tester apparatus must be capable of sampling data as an appropriate function of time in order to provide versatile test results of different parameters while providing for simplest and most efficient calculations.

Accordingly, it is a general object of this invention to provide improved testing devices for compressor characteristics. The same techniques can be used to test power cylinders of internal combustion engines to determine their operating characteristics.

It is a further object of the invention to provide a versatile tester which permits test results to be recorded in terms of variable functions of the compressor cycle.

It is a still further objective of this invention to provide automatic compressor testing apparatus which may be used with a digital computer to perform calculations of compressor performance as a function of pressure readings during a compressor cycle.

Thus in accordance with the invention there is provided a compressor tester system which produces a punched paper tape output record of a sequence of pressure readings within a compressor, so that calculations in a digital computer may be taken therefrom to produce performance results. In preparing the output tape, compressor readings are taken over a series of compressor cycles in accordance with a function of time supplied as a program upon an input paper tape to provide the appropriate function for providing output data of a character that may be simply processed for final test results. Thus the tester provided in accordance with this invention comprises a master oscillator or time reference which provides reference pulses at a sequence of time increments during a cycle of which the compressor performance may be sampled. This oscillator is synchronized with the compressor under test by providing a compressor cycle revolution detector in an automatic frequency control system for the oscillator. The output of the oscillator is available at a counter for an appropriate cyclic count which corresponds with timed increments over the entire compressor cycle. Test results are then sampled at a particular time instant for each cycle when a predetermined count in the counter is reached. Accordingly, a comparator system is provided for taking a sequence of readings from the program tape and corresponding them to different counts in the counter during different compressor cycles, so that the output data may be arrayed in terms of a series of samples taken over-all as if they were an appropriate function of time related to a single compressor cycle.

For example, the input program might provide readings as a function of similar increments of displacement of the cylinder within the compressor chamber by providing a sinusoidal function of time for sampling at the time the counts specified are reached on the counter throughout the required number of cycles. Thus in such operation a different count would be selected each successive cycle of compressor operation to provide a digitized sampled output quantity which signifies the pressure within the compressor chamber, and each successive reading then would be determined by producing a further program step at a different count during the next successive cycle which would provide approximately equal increments of piston displacement. Thus in accordance with the invention the method of taking measurements on each successive compressor cycle as a function of displacement of time is afforded.

Further features and advantages of the invention are described in the following specification with reference to the accompanying drawings, wherein:

FIGURE 1 is a typical graph of pressure variations within a compressor chamber during each repetitive cycle of compressor operation; and FIGURE 2 is a block system diagram of a compressor testing system provided in accordance with the principles of this invention.

The sampling technique of the present invention is based upon the repetitious nature of a compressor cycle. Because of the inertia of a compressor system and the fact that the compressor is driven by rotating machinery which absorbs minor speed fluctuations from cycle to cycle, it has been found that accurate test results may be obtained when a sample reading is taken at an instantaneous position within each of a series of successive compressor cycles. Thus samples may be taken as a function of time from a reference position in the cycle to provide a successive series of pressure readings which can be used for calculating the various performance characteristics of the compressor. Thus as shown in FIGURE 1, a typical pressure diagram for a compressor cycle is shown. It is noted that this cycle is referenced by a fly wheel event timing stroke 50 which may be provided, for example, by a rotating magnet on the fly wheel of the compressor which once in every revolution passes a pickup coil. Thus each cycle is precisely referenced by the actual position of the piston in the compressor cycle.

As shown on the diagram of FIGURE 1, samples may be made of instantaneous pressure readings during the compressor cycle at any desired function of time such as, for example, for the equal time increments of .01 of a second throughout the cycle. Accordingly, after detection of the fly wheel event at $t_0$ a first sample could be made at $t_1$ during the first cyclic revolution of the compressor. Then during each succeeding cycle of compressor operation, the succeeding instantaneous pressure readings can be taken at respective time increments $t_2$, $t_3$, and $t_4$, etc. In accordance with the invention therefore sample may be taken during the compressor cycle as any appropriate function along the time axis, and as will be shown hereinafter, the sampling increments may be programmed to automatically and sequentially occur during each succeeding cycle of compressor operation.

Thus a general system afforded by the invention is shown in block diagram form in FIGURE 2, where the fly wheel event is detected by a revolution detector 10 which is used to record the cyclic repetitive operation provided in the system by medium of the master oscillator 11 and an intermediate automatic frequency control circuit 12. Thus it may be assumed that the master oscillator is synchronized with the compressor pumping cycle and has a frequency high enough to provide the required degree of accuracy within the system. In the embodiment shown, the oscillator is counted down by a typical pulse divider circuit 14 to provide pulses 15 occurring every half degree of shaft rotation to provide a total of 720 pulses per cycle of compressor operation. These pulses are counted through each compressor cycle in the counter 16. Thus any one of 720 time positions during the compressor cycle can be chosen for taking an instantaneous sample reading of pressure within the compressor.

This is accomplished by use of the comparator circuit 17 which compares by way of cable 18 the count within counter 16 and an appropriate function of time set up by medium of the paper tape program reader 20 as taken from a program tape 21 by means of cable 19. The program tape has a series of punched program steps therein 22, 23 etc. defining a function of the sampling times. Thus at any specified count where there is a comparison in comparator 17, a comparison pulse is produced which will cause the digitizer 25 to sample through the compressor pressure transducer 26 and amplifier 27 the pressure reading within the compressor. This sample is digitized in the digitizer 25 so that it can be punched on tape 30 as one of a series of successive output recordings 31, 32, etc. as instructed through the conventional tape recorder device 33. The comparison pulse also serves to advance the tape by way of lead 35 to the paper tape program reader 20, thereby reading in the next function of time at which the sample reading is to be taken on the succeeding cycle. Thus during each 720 count in the counter 16, which represents a compressor cycle, a single digitized sample is taken of the pressure reading within the cycle to give a series of readings representing a function of time expressed on the programmed tape 21. A series of output readings thereby is produced on tape 30 which represent incremental positions on a recorder pressure cycle such as those specified $t_0$, $t_1$, $t_2$, etc. in FIGURE 1. It is apparent that other transducers, such as vibration pickups, temperature sensors, flow meters, or the like, could be used in place of the pressure transducer to produce a series of output performance data readings on tape 30 at positions corresponding to $t_0$, $t_1$, $t_2$, etc.

In connection with the invention, various types of recorded programs could be read and output recordings could be produced, it therefore being evident that the invention is not restricted to use of a paper tape program reader or a paper tape recording device or a progam that must vary from one cycle to the next. Each of the separate pieces of apparatus shown within the blocks of FIGURE 2 is well known in the art and thus need not be described in further detail. For example, various means may be used of controlling the frequency of the master oscillator to synchronize it with the revolution detector 10.

One such technique of control is illustrated for showing the principles of control of this invention and the manner in which a correction is made for any variations of synchronism during each compressor cycle. For this purpose, a terminal count pulse 40 is taken at the lead 41 extending from counter 16 for use in the two flip-flop circuits 42 and 43. These flip-flops have the operational characteristic of remaining in their residence state upon the simultaneous receipt of a set and a reset pulse, but may be changed in state whenever one or the other pulses are received independently. Thus whenever the end of count signal is received in conjunction with the fly wheel event from the revolution detector 10, nothing happens at either flip-flop circuit and the automatic frequency control circuit 12 does not function to change the frequency of the master oscillator 11. However, should the end of count signal 40 be received before the fly wheel event signal 50 is produced, it will serve to set only the flip-flop 42 since flip-flop 43 will already reside in reset condition. Flip-flop 42 when in a set condition will instruct the automatic frequency control circuit to increase the master oscillator frequency by way of lead 52 to an extent determined during the time period such encountered before the flip-flop is again reset by the fly wheel event pulse 50. Thus a control will be given proportional to the amount of discrepancy encountered.

Only this control is necessary if the master oscillator is at a frequency such that it normally runs at a frequency slightly less than that required for complete synchronism. However, if correction of a master oscillator frequency which may be running either too fast or too slow, the alternative flip-flop 43 may be used in the same manner to slow the master oscillator frequency at lead 53 whenever the revolution detector pulse 50 is encountered before the end of count pulse 40. In this case the control would be provided during the period that the flip-flop 43 was in a set condition and it would be reset by the end of count pulse. Fly wheel event pulse 50 is taken by lead 54 extending from revolution detector 10 to counter 16 and used to zero and restart counter for the next cycle.

The two flip-flops shown in the case are cross-coupled by way of lead 57 to provide an overriding feedback pulse so that when either flip-flop is being reset the opposite flip-flop must remain in reset condition thereby confining operation to a single control command from the circuit depending upon which pulse is encountered first.

This illustrated embodiment therefore typifies one type of a phase control circuit that can be used to correct the master oscillator frequency on either side of a center reference frequency which is completely synchronized with the compressor cycle, but any conventional type of a phase control and automatic frequency synchronization circuit for a conventional oscillator can be used in order to tie the oscillator frequency 11 synchronously into the cyclic pattern of the compressor as provided by operation of the revolution detector 10 and the fly wheel event pulse 50.

It has therefore been shown in accordance with the teachings of this invention that an improved testing device for automatically providing a sequence of recorded pressure readings from a cyclic compressor has been provided wherein the readings may be taken automatically as a function of time from a pre-established program and wherein the readings are taken as a succession of samples during each of a successive number of compressor cycles.

Having therefore advanced the state of the art and provided improved apparatus, those novel features believed descriptive of the nature of and the invention are defined with particularity in the following claims, and Letters Patent are requested therefor.

What is claimed is:

1. In an automatic testing device for a cyclic compressor the combination comprising a master oscillator, means synchronizing the oscillator with the compressor cycles, a counter of oscillator pulses cycling through its total count once per compressor cycle, means establishing a program of a sequence of predetermined counts, means comparing the count on said counter with the count of the program steps in sequence to produce a comparison signal, means responsive to the comparison signal to sample and record a pressure reading from said compressor, and means sequencing said program to a successive count step in response to said comparison signal.

2. An automatic digitizing system for producing performance data from a cycling compressor comprising a sampling system for periodically providing a signal of predetermined parameters representative of perforance taking place within the compressor cycle, means producing in step-by-step increments recorded program data in coded form with a set of consecutive codes identifying predetermined increments of time within the compressor cycle in a series of program steps presenting a selected arbitrary function of time increments related to the performance of said compressor, means registering a sequence of time increments throughout said compressor cycle in a form corresponding to said codes, means detecting concurrence between the code in a resident program step with a corresponding registered time increment in said sequence, and means both sampling said signal and advancing the program data to a further step in response to said detected concurrence.

3. A system as defined in claim 2, wherein detection means is provided for determining a predetermined reference position in selected sequential cycles of the compressor; and the registered sequence of time increments is resequenced by each reference position by the detection means to thereby establish a single step of said program for each of the selected cycles.

4. The method of testing compressor performance comprising the steps of cycling the compressor through a repetitive series of similar compression strokes, detecting a reference position in selected sequential cycles of the compressor, establishing a sequence of similar sampling time increments spaced throughout each selected compressor cycle, selecting successive time increments in said sequence responsive to successive detected reference positions, and sampling a signal representative of compressor performance at each of the selected successive time increments thereby producing a series of single signal samples during sequential cycles which progressively advance over the cycle time one of said time increments at a time.

References Cited
UNITED STATES PATENTS

| | | | |
|---|---|---|---|
| 1,532,692 | 4/1925 | Geiger | 73—115 |
| 2,255,809 | 9/1941 | Prescott | 73—115 |
| 3,010,313 | 11/1961 | Weller | 73—116 |
| 3,285,054 | 11/1966 | Heller et al. | 200—46 X |

RICHARD C. QUEISSER, *Primary Examiner.*

J. W. MYRACLE, *Assistant Examiner.*